United States Patent [19]

Weber

[11] Patent Number: 4,621,307

[45] Date of Patent: Nov. 4, 1986

[54] HEADLIGHT FOR MOTOR VEHICLES

[75] Inventor: Walter Weber, Weil der Stadt, Fed. Rep. of Germany

[73] Assignee: Robert Bosch GmbH, Stuttgart, Fed. Rep. of Germany

[21] Appl. No.: 773,195

[22] Filed: Sep. 3, 1985

[30] Foreign Application Priority Data

Sep. 4, 1984 [DE] Fed. Rep. of Germany ....... 3432446
Mar. 19, 1985 [DE] Fed. Rep. of Germany ....... 3509831

[51] Int. Cl.$^4$ ............................................. B60Q 1/04
[52] U.S. Cl. ........................................ 362/66; 362/80; 362/226
[58] Field of Search ..................... 362/80, 66, 61, 226, 362/306, 368, 390

[56] References Cited

U.S. PATENT DOCUMENTS

| | | | |
|---|---|---|---|
| 3,225,189 | 12/1965 | Pendell | 362/390 X |
| 4,293,897 | 10/1981 | Deverrewacre | 362/306 X |
| 4,318,161 | 3/1982 | Shanks | 362/226 |
| 4,318,162 | 3/1982 | Sip | 362/226 |

Primary Examiner—Richard E. Gluck
Attorney, Agent, or Firm—Michael J. Striker

[57] ABSTRACT

The reflector of a headlight is tiltably mounted to a housing by means of an articulated fixed support and by two articulated adjustable supports. Each support includes a first interlocking part step engaging a recess in the housing and a second interlocking part snap engaging a stud at the rear wall of the reflector. The first and second interlocking parts are joined together by a ball and socket joint and all these parts are linked together in the same direction which is parallel to the optical axis of the reflector.

17 Claims, 7 Drawing Figures

HEADLIGHT FOR MOTOR VEHICLES

BACKGROUND OF THE INVENTION

The present invention relates in general to a headlight for a motor vehicle, the headlight being of the type which includes a housing, a reflector provided with means for receiving a bulb, at least two bearing supports for fastening the reflector to the housing, each of the bearing supports having an end portion arrestable in a recess in the housing and another end portion attached to the reflector.

In prior art headlights of this kind, the other end portion of the bearing support has been attached to the reflector mostly by riverting or calking or by clinching. This working processes require corresponding tools and an implement for holding the highlights which due to different directions of working operations must be tiltable relative to the direction of assembly of the headlight. Consequently, such prior art fastening of the bearing support to the reflector requires an increased investment for processing tools which especially in mass production of motor vehicle components is to be avoided.

SUMMARY OF THE INVENTION

It is therefore a general object of the present invention to overcome the aforementioned the disadvantage.

In particular, it is an object of this invention to eliminate the above-described problem of increased investment and manufacturing expenditure during the production of headlights.

Another object of this invention is to provide a headlight which can be assembled with simple technological means.

Still another object of this invention is to provide such an improved headlight whose component parts can be joined together in a single direction whereby the interlocking of the joint component parts follows automatically, thus reducing the installation cost to minimum.

In keeping with these objects and others which will become apparent hereafter, one feature of this invention resides, in a headlight of the aforedescribed kind, in a combination in which each bearing support has an intermediate portion including second interlocking means for snap engaging the other end portion of the bearing support and means for joining together the first and second interlocking means, the joining means being linked to respective interlocking means in parallel directions. Preferably, the parallel directions of joining during the assembly coincides with the optical axis of the reflector. With advantage, the second interlocking means includes a sleeve of an elastic synthetic material which on its inner wall is formed with an inwardly directed catch, and the other end portion of the bearing support is in the form of a stud projecting from the rear wall of the reflector and being formed with an indent which upon insertion of the stud in the sleeve snap engages the catch of the latter. This arrangement of the interlocking means provides for an advantageous shaping of the reflector in the region of the interlock and also guarantees a flowless joining of the component parts without the need for a visual inspection. Preferably, the stud projecting from the rear of the reflector has a rectangular cross-section which converges toward its free end.

The second interlocking means is located mostly at a location of the headlight which is accessible with difficulties only. To facilitate the exchange of the reflector, there is provided an unlocking unit projecting through a hole in the rear side of the housing. The unlocking mechanism includes a catch provided with a finger projecting through the housing and further includes an eccenter formed on the sleeve of the second interlocking means and cooperating with a gripper on the rear side of a catch.

The novel features which are considered as characteristic for the invention are set forth in particular in the appended claims. The invention itself, however, both as to its construction and its method of operation, will be best understood from the following description of preferred embodiments when read in connection with the accompanying drawings.

DESCRIPTION OF THE PREFERRED EMBODIMENTS

Figure 1:
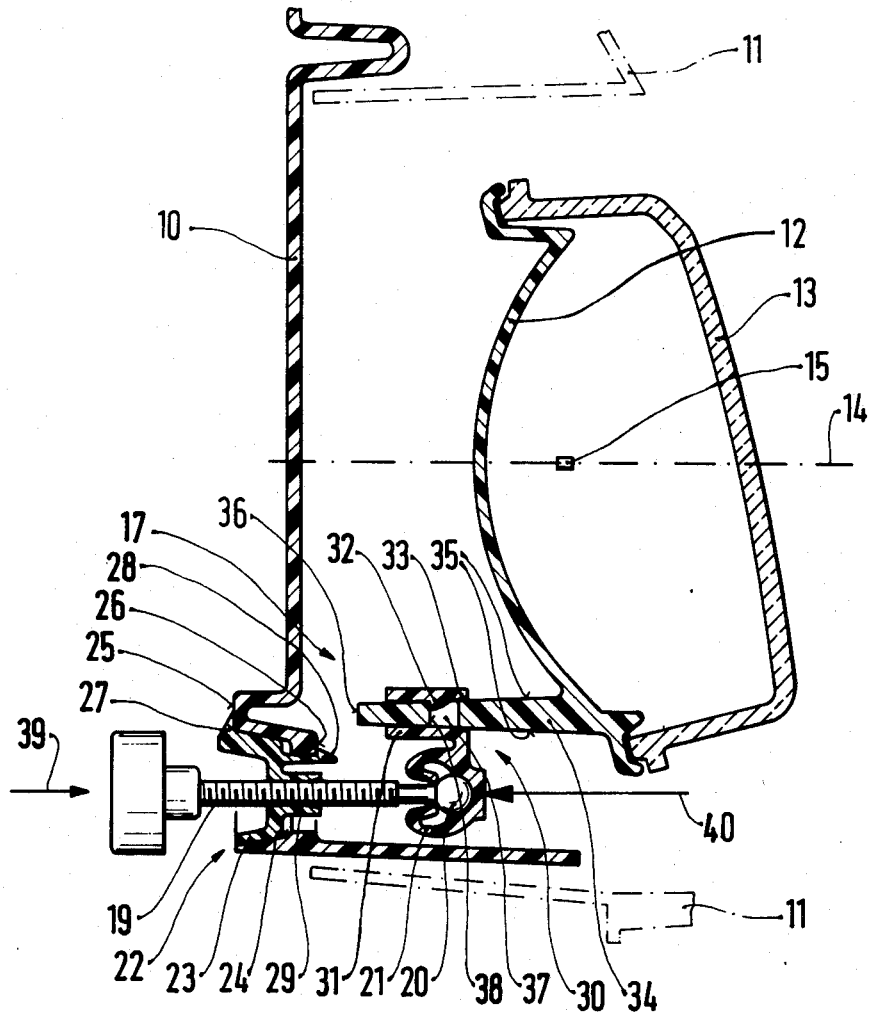
FIG. 1 is a sectional side view of a headlight of this invention, shown in a plane crossing through an adjustable bearing support for a vertical position adjustment.
Figure 2:
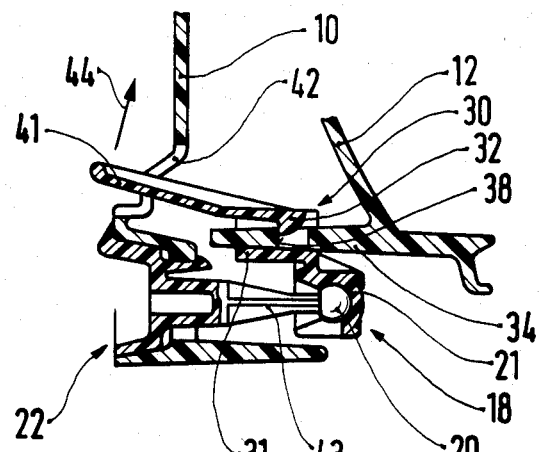
FIG. 2 is a sectional side view of a modification of a cut-away part of the headlight of FIG. 1, shown in a plane passing through a fixed bearing support.
Figure 3:
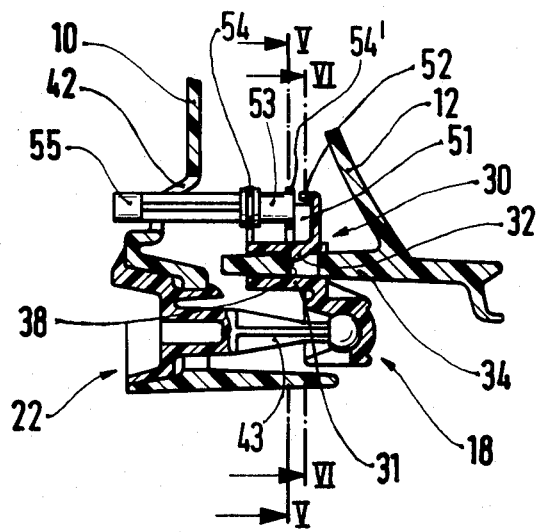
FIG. 3 is a sectional side view of another embodiment of the fixed bearing support of FIG. 2.

A car headlight illustrated in FIG. 1 has a housing 10 made of a synthetic material. The housing is secured to the body 11 of the motor vehicle in conventional manner. A reflector 12 made of a duroplastic synthetic material has in the range of its optical axis 14 an incandescent bulb 15 and supports a light diffusing disc 13. The reflector 12 is mounted on the housing 10 by a three-point bearing arrangement which is adjustable both in vertical and in horizontal direction to tilt the headlight into its operative position. In FIG. 1, there is illustrated adjustable bearing support 17 for the vertical adjustment. Another bearing support of similar construction is provided for the horizontal adjustment of the reflector but is not illustrated for the sake of clarity. A fixed bearing support 18 is shown in FIGS. 2 and 3.

The adjustable bearing support 17 includes an adjustment spindle 19 controlled by a control knob from the rear side of the housing and terminating at opposite ends with a ball pin 20 arranged in a socket 21 to form a ball-socket joint whose function will be explained below. A first interlocking arrangement 22 has a bearing part 23 made of an elastic synthetic material. The bearing part 23 is inserted from the rear side into an opening 24 of the housing and pushed in the direction of arrow 39 until its claw 27 abuts against a projecting shoulder 25 on the housing and a catch 28 snap engages another shoulder 26 on the other side of the housing. The part 23 is formed with a central passage provided with an inner thread 29 engaging the adjustment spindle 19.

A second interlocking arrangement 30 includes a sleeve 31 which is integrally connected with the socket 21. The inner wall of the sleeve 31 is formed with a catch 32 which is elastically connected to the sleeve 31 by two lateral webs 33 of which only one is illustrated in the drawing. From the rear side of the reflector, there projects in the direction of optical axis 14 a stud 34 having a rectangular cross-section matching the cross-section of the sleeve 31. The stud 34 is insertable into the sleeve 31 and its both sides 35 converge in the direction to the free end face 36 of the stud. One of the broad sides 35 is formed with a recess 37 defining a shoulder 38 which snap engages the catch on the inner wall of the sleeve.

The first and second interlocking arrangements 22 and 30 of the adjustable bearing support 17 are joined together as follows:

First, the part 23 together with the adjustment spindle 19 are pushed in the direction of arrow 39 parallel to the optical axis 14 of the reflector into the opening 24 of the housing until the part 23 snap engages the shoulder 25 and 26 on the housing. Thereupon, the socket 21 together with the integrally connected sleeve 31 are moved in the direction of arrow 40 parallel to the axis 14 until the ball pin engages the socket 21. Thereupon the stud 34 on the rear wall of reflector 12 is inserted in the direction of arrow 40 into the sleeve 31 whereby its elastic catch 32 snap engages shoulder 38 in the recess of the stud 34.

The fixed bearing support 18 illustrated in FIG. 2 is similar in construction to the bearing support 17 and differs from the latter only by the provision of a fixed stud 43 instead of the adjustable spindle 19. The stud 43 is terminated at its free end with the ball pin 20. The remaining components of the bearing support 18 are similar to those described in FIG. 1, and are indicated by like reference numerals. In addition, the second interlocking arrangement 30 is provided with a finger 41 which protrudes rearwardly to a hole 42 in the housing 10. The finger 41 acts as an unlocking member for the second arresting arrangement 30. By exerting pressure in the direction 44, the hook or catch 32 is lifted from the shoulder 38 on the stud 34 whereupon the latter together with reflector 12 can be removed against the direction of arrow 40 from the locking sleeve 31.

A second embodiment of the unlocking member, shown in FIG. 3, includes an eccenter 51 which cooperates with a gripper 52 in the form of a shoulder on the sleeve 31. The gripper 52 projects radially outwardly oppposite the catch 32. The eccenter 51 is shaped on the end face of a bolt 53 which is rotatably supported in two bearings 54 and 54' attached to the outer surface of the sleeve 31. The bolt 53 is secured against axial displacement and its rear end portion 55 projects through the hole 42 beyond the rear side of the housing 10. In this embodiment, the second interlocking arrangement 30 is unlocked by rotating the bolt 53 about 90° whereby the gripper 52 releases the eccenter 51.

Figure 4:
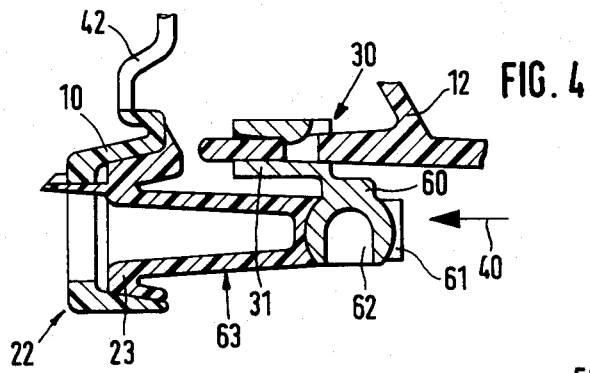
FIG. 4 is a variation of the ball and socket joint in the bearing support.

In the modification of ball and socket joint in FIG. 4, a pin ball 60 projects from the locking sleeve 31 at right angles to the arrow 40. The ball pin 60 is formed with a blind bore 62 which increases the elasticity of the ball 60. The part 23 of the first interlocking arrangement 22 is integral with a sleeve like fixed stud 63 which is rectangular in cross-section and is terminated with two parallel arms 61 delimiting a cup-shaped socket for receiving in transverse direction to the arrow 40 the ball pin 60 (ball-socket joint).

Figure 5:
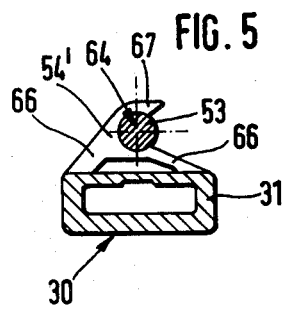
FIG. 5 is a sectional view of a second bearing part of an unlocking member, shown in cross-section along the line V—V in FIG. 3.

The second bearing 54' for the unlocking bolt 53 of FIG. 3 is illustrated in transverse section in FIG. 5. It has the form of a bushing with an undercut 67 and with two arms 66 embedded in the sleeve 31 of the second interlocking arrangement 30. The bolt 53 snap engages through the undercut 67 the bearing 54' in transverse direction to its center axis 64.

Figure 6:
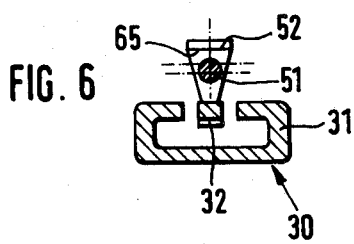
FIG. 6 is a sectional view of an eccenter taken along the line VI—VI in FIG. 3.

FIG. 6 illustrates the eccenter 51 of the bolt 53 acting as an unlocking member. The eccenter has circular cross-section. The gripper 52 projecting from the upper surface of the sleeve 31 has a flat shoulder 65 which rests in the locking position on the eccenter 51. FIG. 6 shows the eccenter in its unlocking position.

Figure 7:
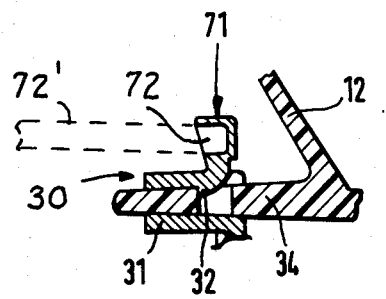
FIG. 7 is a sectional view of another variation of the unlocking member.

The second interlocking arrangement illustrated in FIG. 7 shows the stud 34 (forming the end part of the bearing support which is attached to the reflector 12) in snap engagement with the catch 32 in the sleeve 31. The catch 32 is extended into a radially outwardly projecting unlocking member 71, the latter being formed with a transverse blind bore 72 into which a tool 72' illustrated in dashed line is insertable through the hole 42 in the housing 10. In depressing the tool, the catch is lifted from the recess in the stud 34 and the arrangement 30 is unlocked.

It will be understood that each of the elements described above, can find a useful application in other types of constructions differing from the types described above.

While the invention has been illustrated and described as embodied in specific examples of car headlights, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A headlight for a motor vehicle comprising a housing, a reflector, at least one articulated support for attaching the reflector to the housing, said support having one end portion provided with first interlocking means for snap engaging a recess in the housing, another end portion secured to the reflector, and an intermediate portion, said intermediate portion including second interlocking means for snap engaging said other end portion in a direction parallel to the engagement of said first interlocking means, and means for joining together the first and second interlocking means, said joining means snap engaging one of said interlocking means in a direction parallel to the direction of engagement of respective interlocking means.

2. A headlight as defined in claim 1, wherein the direction of engagement of said first and second interlocking means is parallel to an optical axis of the reflector.

3. A headlight as defined in claim 2, wherein said housing includes abutment shoulders formed at opposite sides of said recess, said first interlocking means includes a part of an elastic synthetic material insertable into the recess and snap engaging from opposite sides said abutment shoulders.

4. A headlight as defined in claim 3, wherein said second interlocking means includes a sleeve of an elastic synthetic material, a catch provided in said sleeve, said other end portion of each support being in the form of a stud secured at one end thereof to the rear wall of said reflector and projecting parallel to the optical axis of the reflector, said stud being provided with a detent which snap engages the catch in said sleeve.

5. A headlight as defined in claim 4, wherein said stud and the inner surface of said sleeve have matching rectangular cross-sections, said stud being formed with a transverse opening defining a shoulder forming said detent, and said catch being provided with at least one webs connected to said sleeve.

6. A headlight as defined in claim 5, wherein said stud has a free end and two opposite broad sides converging to said free end.

7. A headlight as defined in claim 5, wherein said catch is provided with an unlocking member accessible through an opening in said housing.

8. A headlight as defined in claim 7, wherein said unlocking member is in the form of an elongated finger projecting from said catch through said opening.

9. A headlight as defined in claim 7, wherein said unlocking member includes an eccenter supported for rotation on said sleeve and cooperating with a gripper formed on said catch.

10. A headlight as defined in claim 4, wherein said joining means includes a ball and socket joint connected between said first and second interlocking means.

11. A headlight as defined in claim 10, wherein one of said interlocking means is terminated with a pin integral with a ball of said joint and the other interlocking means is connected to a socket for said ball.

12. A headlight as defined in claim 4, wherein said first interlocking means terminates with two parallel arms extending in said direction of engagement and defining a cup-shaped socket and the sleeve of the second interlocking means being integral with a ball pin extending transversely to said direction of engagement for snap engaging said arms.

13. A headlight as defined in claim 12, wherein the ball of said ball pin has a blind bore directed toward said sleeve.

14. A headlight as defined in claim 12, wherein said first interlocking means is integral with a sleeve like stud of a rectangular cross-section, said two arms being formed on the free end of said stud.

15. A headlight as defined in claim 9, wherein said eccenter is formed on a shaft, said sleeve being provided with bearings having an undercut and said shaft being insertable laterally into the bearings through said undercut.

16. A headlight as defined in claim 15, wherein said eccenter is in the form a circular disc attached to said shaft and said gripper having an angular shoulder overlapping said eccenter.

17. A headlight as defined in claim 7, wherein said unlocking member is formed with a blind bore oriented toward said opening in the housing to receive a tool operated by a user to disengage the second interlocking means.

* * * * *